United States Patent
Kayama et al.

(10) Patent No.: US 7,422,538 B2
(45) Date of Patent: Sep. 9, 2008

(54) AUTOMATIC SPEED CHANGER

(75) Inventors: Kazumichi Kayama, Anjo (JP);
Nobutada Sugiura, Anjo (JP); Shundo Yamaguchi, Anjo (JP); Takeo Arai, Anjo (JP); Tomochika Inagaki, Anjo (JP)

(73) Assignee: Aisin AW Co., Ltd. (JP)

( * ) Notice: Subject to any disclaimer, the term of this patent is extended or adjusted under 35 U.S.C. 154(b) by 116 days.

(21) Appl. No.: 10/519,456

(22) PCT Filed: Dec. 26, 2003

(86) PCT No.: PCT/JP03/17068

§ 371 (c)(1),
(2), (4) Date: Dec. 29, 2004

(87) PCT Pub. No.: WO2004/061331

PCT Pub. Date: Jul. 22, 2004

(65) Prior Publication Data

US 2005/0245344 A1 Nov. 3, 2005

(30) Foreign Application Priority Data

Dec. 27, 2002 (JP) .............................. 2002-379261

(51) Int. Cl.
*F16H 3/62* (2006.01)

(52) U.S. Cl. ...................................................... 475/275

(58) Field of Classification Search .................. 475/269, 475/271, 275, 284, 285, 296, 297, 146, 311–313, 475/323–325; 74/606 R
See application file for complete search history.

(56) References Cited

U.S. PATENT DOCUMENTS

| | | | | |
|---|---|---|---|---|
| 5,133,697 A | * | 7/1992 | Hattori | 475/276 |
| 5,342,257 A | | 8/1994 | Hotta et al. | 475/275 |
| 5,525,117 A | * | 6/1996 | Morisawa et al. | 475/281 |
| 5,865,289 A | * | 2/1999 | Ishimaru | 192/87.11 |
| 6,176,802 B1 | * | 1/2001 | Kasuya et al. | 475/269 |
| 6,849,022 B2 | | 2/2005 | Miyazaki et al. | 475/275 |
| 6,960,150 B2 | * | 11/2005 | Armstrong et al. | 475/276 |
| 7,226,380 B2 | * | 6/2007 | Kayama et al. | 475/275 |

(Continued)

FOREIGN PATENT DOCUMENTS

DE 102 00 379 A1 1/2002

(Continued)

*Primary Examiner*—Dirk Wright
(74) *Attorney, Agent, or Firm*—Bacon & Thomas, PLLC

(57) ABSTRACT

A first planetary gear unit PR and a clutch C3 for outputting reduced speed rotation are located on one axial side of a second planetary gear unit PU, and a clutch C1 for connecting and disconnecting an input shaft 2 to/from a sun gear S2 and a clutch C2 for connecting and disconnecting the input shaft 2 input to/from a carrier CR2 are located on the other axial side of the second planetary gear unit PU. An output mechanism is located between the first and second planetary gear units. As compared with a drivetrain wherein the clutch C1 or clutch C2 is located between the two planetary gear units, the two planetary gear units can be located closer together, and a transmitting member that transmits the reduced speed rotation can be made shorter. Further, compared to a drivetrain wherein the clutches C1, C2, C3 are located together on one axial side, the oil supply to the hydraulic servos can be simplified.

17 Claims, 10 Drawing Sheets

U.S. PATENT DOCUMENTS

| | | |
|---|---|---|
| 2002/0091032 A1 | 7/2002 | Hayabuchi et al. .......... 475/278 |
| 2002/0142880 A1 | 10/2002 | Hayabuchi et al. .......... 475/275 |
| 2003/0109353 A1* | 6/2003 | Miyazaki et al. ............ 475/275 |
| 2004/0248684 A1 | 12/2004 | Sugiura et al. ................ 475/31 |

FOREIGN PATENT DOCUMENTS

| | | |
|---|---|---|
| DE | 102 13 820 A1 | 3/2002 |
| EP | 0 475 410 A2 | 9/1991 |
| EP | 0 997 663 A2 | 10/1999 |
| JP | 04-125345 | 4/1992 |
| JP | 7-133850 | 5/1995 |
| JP | 2000-274498 | 3/2000 |
| JP | 2000-199549 | 7/2000 |
| JP | 2001-082555 | 3/2001 |
| JP | 2002-227940 | 8/2002 |
| JP | 2002-295608 | 10/2002 |

* cited by examiner

ENGAGEMENT TABLE

|  |  | C1 | C2 | C3 | B1 | B2 | F1 |
|---|---|---|---|---|---|---|---|
|  | P |  |  |  |  |  |  |
|  | R |  |  | ○ |  | ○ |  |
|  | N |  |  |  |  |  |  |
| D | FIRST SPEED | ○ |  |  |  | (○) | ○ |
| D | SECOND SPEED | ○ |  |  | ○ |  |  |
| D | THIRD SPEED | ○ |  | ○ |  |  |  |
| D | FOURTH SPEED | ○ | ○ |  |  |  |  |
| D | FIFTH SPEED |  | ○ | ○ |  |  |  |
| D | SIXTH SPEED |  | ○ |  | ○ |  |  |

FIG.2

ENGAGEMENT TABLE

|   |   | C1 | C2 | B1 | B2 | B3 | F1 |
|---|---|---|---|---|---|---|---|
| P |   |   |   |   |   |   |   |
| R |   |   |   |   | ○ | ○ |   |
| N |   |   |   |   |   |   |   |
| D | FIRST SPEED | ○ |   |   | (○) |   | ○ |
|   | SECOND SPEED | ○ |   | ○ |   |   |   |
|   | THIRD SPEED | ○ |   |   |   | ○ |   |
|   | FOURTH SPEED | ○ | ○ |   |   |   |   |
|   | FIFTH SPEED |   | ○ |   |   | ○ |   |
|   | SIXTH SPEED |   | ○ | ○ |   |   |   |

FIG.6

ENGAGEMENT TABLE

|   |   | C1 | C2 | C3 | B1 | B2 | F1 |
|---|---|---|---|---|---|---|---|
|   | P |   |   |   |   |   |   |
|   | R |   |   | ○ |   | ○ |   |
|   | N |   |   |   |   |   |   |
| D | FIRST SPEED | ○ |   |   |   | (○) | ○ |
| D | SECOND SPEED | ○ |   |   | ○ |   |   |
| D | THIRD SPEED | ○ |   | ○ |   |   |   |
| D | FOURTH SPEED | ○ | ○ |   |   |   |   |
| D | FIFTH SPEED |   | ○ | ○ |   |   |   |
| D | SIXTH SPEED |   | ○ |   | ○ |   |   |

FIG.9

AUTOMATIC SPEED CHANGER

CROSS-REFERENCE TO RELATED APPLICATION

This application is a National Phase Application (35 USC 371) of PCT/JP2003/017068 and claims priority of Japanese Application No. 2002-379261, filed Dec. 27, 2002.

TECHNICAL FIELD

The present invention relates to an automatic transmission for a vehicle, and more specifically, it relates to an automatic transmission wherein multiple speeds are enabled by input of reduced speed rotation into one of the rotary components of a planetary gear unit.

BACKGROUND ART

One type of conventional automatic transmission incorporated into vehicles or the like comprises a first planetary gear unit with two rows of linked planetary gearing, and a second planetary gear unit which reduces the rotational speed of the input shaft (for example, see Japanese Unexamined Patent Application Publication No. 4-125345). The transmission disclosed in this publication provides, for example, six forward speeds and one reverse speed by input of reduced speed rotation from a second planetary gear unit via a clutch to, for example, one of four rotary components of the first planetary gear unit. Further, in the case of fourth speed forward, for example, when the rotation of the input shaft is input into two of the rotary components of the first planetary gear unit, this fourth speed forward can be become a directly coupled state, with the output at the same rotational speed as the input shaft.

The above-described automatic transmission comprises two clutches for inputting the rotation of the input shaft into two of the rotary components of the first planetary gear unit, and a second planetary gear unit for outputting the reduced rotation into the rotary components of the first planetary gear unit. However, if those two clutches or the hydraulic servos that control their engagement are positioned between the first and second planetary gear units, the element for transmitting the reduced speed rotation of the second planetary gear unit to a rotary component of the first planetary gear unit must be axially elongated.

The elongation of the element that transmits the reduced speed rotation means that the unit transmitting that rotation with high torque must also be elongated. Further, if an elongated element must withstand the larger torque, it must be fabricated of a relatively thicker material which prevents making a more compact automatic transmission. Further, because the weight of such a member would be increased, not only is the objective of a lightweight automatic transmission defeated, but also inertia (inertial force) would increase, reducing the controllability of the automatic transmission and increasing shock in speed changes.

Further, for example, in order to selectively input the reduced speed rotation output to the first planetary gear unit from the second planetary gear unit, a clutch or brake must be provided. In the case that a clutch is provided, this clutch and the above-described two clutches, a total of three clutches, are necessary. A clutch generally includes a clutch drum that transmits the input rotation to friction plates, and therefore, for example with a problem such as relative rotation, oil pressure to the oil compartment of the hydraulic servo of the clutch must be supplied from the mid-section of the automatic transmission.

However, if the aforementioned three clutches are arranged in series on one axial side of the planetary gear unit, for example, the oil lines for supplying oil pressure to the three hydraulic servos must be provided in triplicate in the mid-section of the automatic transmission, and the configuration of the oil lines become complicated.

SUMMARY OF THE INVENTION

Accordingly, the object of the present invention is to solve the above problems by providing an automatic transmission with a first clutch that is located between a decelerating planetary gear unit and an input shaft, and a brake for fixing a rotary component, on one axial side of a second planetary gear unit, and with a second clutch and a third clutch on the other axial side of the second planetary gear unit.

Accordingly, the present invention provides an automatic transmission comprising: an input shaft that transmits the output rotation of a drive source; a decelerating first planetary gear unit comprising an input rotary component which receives the rotation of the input shaft, an intermediate component, a decelerated rotary component that rotates at a reduced speed based on rotation received from the input rotary component through the intermediate component; engaging means for controlling the rotation of the input rotary component or rotation of the intermediate component; a second planetary gear unit comprising first, second, third and fourth rotary elements for receiving the decelerated rotation transmitted from the decelerated rotary component; a first clutch for selectively connecting the input shaft and the second rotary element; a second clutch for selectively connecting the input shaft and the third rotary element; and an output member for outputting the rotation of the fourth rotary element to a wheel drive mechanism. The automatic transmission of the present invention provides at least five forward speeds and one reverse speed.

The first clutch and the second clutch are engaged together in fourth speed forward. The first planetary gear unit and the engaging means are located on one axial side of the second planetary gear unit, while the first and second clutches are located on the other axial side of the second planetary gear unit and the output member is located between (1) the second planetary gear unit and (2) the decelerating first planetary gear unit and the engaging means.

Accordingly, the automatic transmission of the present invention provides at least five forward speeds and one reverse speed with direct coupling in fourth speed forward and, compared to the case wherein two clutches are located between the first and second planetary gear units, the planetary gear units can be located closer together, and the transmitting member for transmitting the decelerated rotation can be made relatively shorter. Therefore, the automatic transmission can be made more compact and lightweight, and further, because the inertia (inertial force) can be reduced, the controllability of the automatic transmission is improved, and the occurrence of speed change shock is reduced.

Further, due to the output unit being located axially between the second planetary gear unit and the first (speed reducing) planetary gear unit and the engaging means, the output unit can be located in approximately the axial center of the automatic transmission. Thus, when the automatic transmission is mounted on a vehicle, there is no need for enlargement in one axial direction because the output unit is mounted adjacent the drive wheel transmission mechanism. Because of this, particularly in the case of a FF vehicle, interference with the front wheels is reduced, and the mountability on the vehicle is improved, e.g. the steering angle is greatly improved.

The engaging means may be a first clutch located between the input shaft and the input rotary component, and/or a first brake for braking the intermediate component. The first clutch is designed to engage at relatively slow to medium speeds.

Compared to transmissions wherein three clutches are located on one side of the planetary gear unit, in the transmission of the present invention the design of an oil line to provide oil to the hydraulic servos for these clutches and the manufacturing process can be simplified and the costs brought down. Further, since the friction members and hydraulic servo of the third clutch can be made smaller, it can be located on the radially inner side of the second brake, and the automatic transmission can be made more compact.

The engaging means may also be a third clutch located between the input shaft and the input rotary component.

Further, where three clutches are provided, compared to the case wherein three clutches are located on one side of the planetary gear unit, the construction of an oil line to provide oil to the hydraulic servos for these clutches can be made easily, the manufacturing process can be simplified and the costs can be brought down. Further, since the friction members and hydraulic servo of the third clutch can be made smaller, the third clutch can be located radially inward of the second brake, and the automatic transmission can be made more compact.

In one embodiment the present invention also includes a second brake for fixing the first rotary element which receives input of the decelerated rotation. The second brake and the third clutch each include friction members and a hydraulic servo for engaging the friction members. The friction members of the third clutch are located radially outward of the friction members of the second brake. Accordingly, the third clutch is between the input shaft and input rotary component, whereby the load on the third clutch can be reduced as compared to arrangements wherein, for example, the third clutch is between the input rotary component and first rotary element. Therefore, the third clutch can be made more compact, so the friction members of the third clutch and its hydraulic servo can be reduced in size, allowing location on the radially inner side of the second brake, thereby enabling the automatic transmission to be made more compact.

The third clutch may be located between the first (reducing) planetary gear unit and the output member with the drum member of the third clutch opening toward the first reducing planetary gear unit.

The present invention may also include a linking unit (or "member") for linking the decelerated rotary component and the first rotary element, with the third clutch located on the radially inner side of the linking unit.

The hydraulic servo of the third clutch is preferably located on the input shaft, in communication with an oil path extending from the case through an oil path provided in the input shaft.

The third clutch includes friction members and a hydraulic servo for engaging the friction members; wherein the hydraulic servo is axially located on the side of the friction members opposite the first (decelerating) planetary gear unit, and the cylinder of this hydraulic servo is linked to the input shaft.

The first brake may be axially located on the same side of the second planetary gear unit as the first planetary gear unit, with its hydraulic servo formed in the case.

The present invention preferably also includes a second brake for fixing the first rotary element which receives input of the reduced speed rotation. In such embodiments the first brake and the second brake each include friction members and a hydraulic servo for engaging the friction members, the hydraulic servo of the first brake may be located on the radially inward side of the hydraulic servo of the second brake, and the friction members of the first brake mesh with members extending between the hydraulic servo of the first brake and the hydraulic servo of the second brake.

In embodiments wherein a second brake is provided to fix the first rotary element against rotation, the engaging means may be located radially inward of the second brake.

When the first clutch is released at a relatively high speed or in reverse, with the unit connecting this first clutch and second rotary element rotating at the relatively high speed or in reverse, there may be cases wherein the transmitting member that transmits the decelerated rotation from the first planetary gear unit is rotating at a reduced speed or is fixed, and there is a large difference in rotational speed between the first clutch and the transmitting member. However, because the first clutch is axially located on the side of the second planetary gear unit opposite the first planetary gear unit, that is to say, the unit with a relatively high speed rotation or reverse rotation and the unit with decelerated rotation (particularly the linking member) can be spaced apart and, compared with the case wherein for example those units are in contact in a multi-axial arrangement, a decrease in efficiency of the automatic transmission resulting from the relative speed difference between members can be prevented.

The first clutch includes friction members, a hydraulic servo that engages the friction members, and a hub which is linked with the second rotary element, with the cylinder of the hydraulic servo linked with the input shaft.

Preferably, the linking member that links the reduced speed rotary component of the first planetary gear unit with the first rotary element of the second planetary gear unit, passes through the output member, i.e., radially inward of the inner circumference of the output member.

The present invention preferably further includes a differential unit for outputting rotation to drive wheels, and a counter shaft unit engaged with the differential unit, wherein the output member is a counter gear meshing with the counter shaft unit.

The second planetary gear unit is preferably a multiple type planetary gear unit, including a first sun gear, a long pinion which meshes with the first sun gear, a short pinion which meshes with the long pinion, a carrier for rotationally supporting the long pinion and the short pinion, a second sun gear meshing with the short pinion, and a ring gear meshing with the long pinion. In such an embodiment the first rotary element is the first sun gear capable of receiving input of the decelerated rotation from the decelerated rotary component, and is fixed by the second brake; the second rotary element is the second sun gear for receiving input of rotation of the input shaft by engagement of the first clutch; and the third rotary element is a carrier capable of receiving input of the rotation of the input shaft by engagement of the second clutch, and which is fixed by engagement of a third brake; and wherein the fourth rotary element is the ring gear linked to the output member.

In operation, preferably, in first speed forward, the first clutch and the third brake are engaged; in second speed forward, the first clutch and the second brake are engaged; in third speed forward, decelerated rotation is input to the first rotary element from the decelerated rotary component, and the first clutch is engaged; in fourth speed forward, the first clutch and the second clutch are both engaged; in fifth speed forward, decelerated rotation is input to the first rotary element from the decelerated rotary component, and the second clutch is engaged; and in sixth speed forward, the second clutch and the second brake are engaged; and in first speed reverse, reduced speed rotation is input to the first rotary element from the decelerated rotary component and the third brake is engaged; whereby six forward speeds and one reverse speed can be achieved.

BRIEF DESCRIPTION OF THE DRAWINGS

FIG. 2 is a table of operations of the automatic transmission of the first embodiment;

FIG. 6 is a table of operations of the third embodiment;

FIG. 9 is a table of operations of the automatic transmission according to the fourth embodiment.

DESCRIPTION OF THE PREFERRED EMBODIMENTS

First Embodiment

A first embodiment of the present invention will be described with reference to FIG. 1 through FIG. 3 below.

Figure 1:
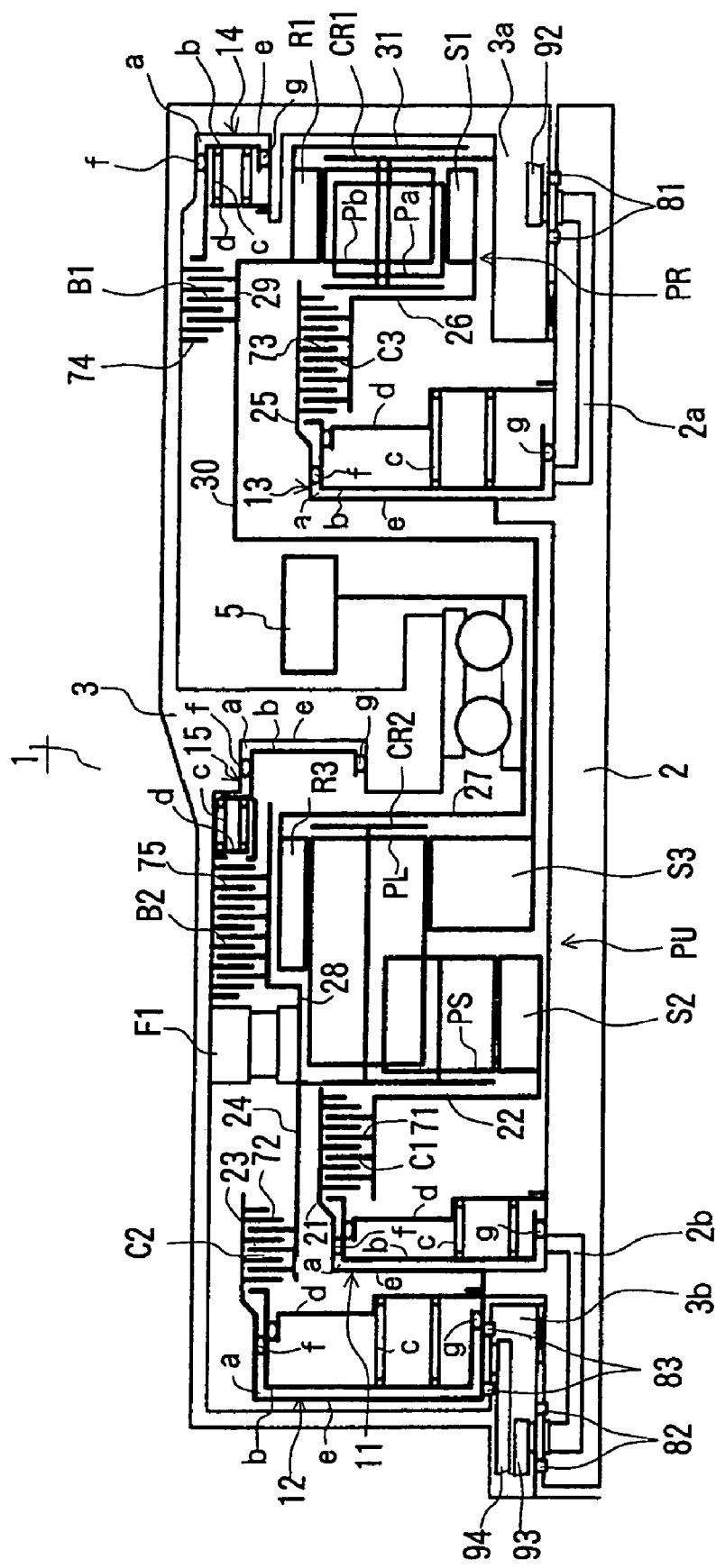
FIG. 1 is a schematic cross-sectional view of a first embodiment of an automatic transmission according to the present invention.

The automatic transmission of the first embodiment of the present invention as illustrated in FIG. 1 is particularly favorable for a FF (front engine, front wheel drive) vehicle, and has a torque converter housing, not illustrated, and a transmission case 3. Within the torque converter housing is a torque converter, not illustrated. The transmission case 3 houses an automatic transmission $1_1$, a counter shaft unit (drive wheel transmission mechanism), not illustrated, and a differential unit (drive wheel transmission mechanism).

The torque converter is arranged, for example, with its axis centered on input shaft 2 of the automatic transmission $1_1$, which is on the same axis as the output shaft of the engine (not illustrated), and the automatic transmission $1_1$ is also centered on the axis of the engine.

The above-mentioned counter shaft unit includes a counter shaft (not illustrated) with its axis arranged parallel to the input shaft 2, and the above-mentioned differential unit has a lateral axle, not illustrated, arranged with its axis parallel to that of the counter shaft.

The automatic transmission $1_1$ of the first embodiment will now be described with reference to FIG. 1. As illustrated in FIG. 1, the automatic transmission $1_1$ comprises a front (second) planetary gear unit PU and a rear (first) planetary gear unit PR on the input shaft 2. The front planetary gear unit PU is a multiple-type planetary gear unit, which has a sun gear S2 (the second rotary element), a carrier CR2 (the third rotary element), a ring gear R3 (the fourth rotary element), and a sun gear S3 (the first rotary element), as the four rotary elements. The carrier CR2 has a long pinion PL that meshes with a sun gear S3 and a ring gear R3, and a short pinion PS that meshes with a sun gear S2. Pinions PL and PS are meshed with one another. The rear planetary gear unit PR is a double planetary gear unit which includes a carrier (intermediate component) CR1, a pinion Pb which meshes with a ring gear (reduced speed rotary component) R1 and a pinion Pa which meshes with a sun gear (input rotary component) S1. Pinions Pa and Pb are meshed one to another.

A hydraulic servo 13, friction plates 73, a clutch drum, and a multi-disc clutch C3 (the third clutch), which includes a hub unit 26, are arranged centered on the input shaft 2.

The hydraulic servo 13, includes a piston unit b for engaging the friction plates 73, a drum-shaped member 25 that has a cylinder unit e, an oil chamber "a" which is formed as a space sealed by seal rings f and g between the piston unit b and the cylinder unit e, a return spring c that biases piston unit b toward oil chamber "a", and a return plate d that bears the force of the return spring c.

The other hydraulic servos are similarly constructed, having an oil chamber "a", a piston unit b, return spring c, return plate d, cylinder unit e, and seal rings f and g, and, therefore, description thereof will be omitted.

The oil chamber "a" of hydraulic servo 13 is connected to an oil line 2a which is formed in the input shaft 2, and this oil line 2a is connected to an oil line 92 at a boss 3a of case 3 which forms a sleeve around input shaft 2. Oil line 92 connects to an oil pressure control unit, not illustrated. Thus, because the hydraulic servo 13 is arranged on input shaft 2, an oil path from the oil pressure control unit to the oil chamber "a" of the oil pressure servo 13 is constructed simply by providing one set of seal rings 81 between boss 3a and the input shaft 2.

The input shaft 2 is connected to the drum 25 having an inner circumferential surface to which the friction plates 73 of the clutch C3 are splined. The friction plates 73 of clutch C3 are intermeshed with friction plates splined to the hub 26 which is connected to the sun gear S1. Carrier CR1 supports the pinions Pa and Pb. Pinion Pb meshes with the ring gear R1, and pinion Pa meshes with the sun gear S1 which is connected to the input shaft 2. The carrier CR1 is secured to the boss 3a of the case 3 via a side plate, and the ring gear R1 is supported for free rotation by the boss 3a through member 31.

Arranged on the outer circumferential side of this ring gear R1 is a multi-disc brake B1 (the second brake) that includes a hydraulic servo 14, friction plates 74, and a hub 29. The friction plates 74 are intermeshed with friction plates splined to the outer circumferential surface of the hub 29. The hub 29 is connected to ring gear R1 at one axial end, and is connected at its other axial end to a transmitting member 30 that transmits the rotation of the ring gear R1 when clutch C3 is engaged and that, in turn, is connected to the sun gear S3 of the second planetary gear unit PU. In other words, the ring gear R1 and the sun gear S1 are constantly connected with no clutch located between, and rotation is constantly transmitted between S1 and R1.

At the front end of the input shaft 2 (left side of diagram) is a multi-disc clutch C1 ("first clutch") that includes a hydraulic servo 11, friction plates 71, a clutch drum 21, and a hub 22. A boss 3b extends axially from the front side of the case 3 and is formed as a sleeve around the input shaft 2. A multi-disc clutch C2 ("second clutch") includes a hydraulic servo 12, friction plates 72, a clutch drum 23, and a hub 24.

The oil chamber "a" of hydraulic servo 11 is connected to oil line 2b formed in input shaft 2, and oil line 2b is connected to an oil line 93 in the boss 3b. Line 93, in turn, connects to an oil pressure control device, not illustrated. Thus, the hydraulic servo 11 has an oil line for communication of oil chamber "a" with the oil pressure control device formed with one set of seal rings 82 that form a seal between the boss 3b of the case 3 and the input shaft 2.

The oil chamber "a" of the hydraulic servo 12 is connected to an oil line 94 in the boss 3b which, in turn, connects to the oil pressure control device, not illustrated. Thus, the oil chamber "a" of oil pressure servo 12 is connected to the oil pressure control device through a connection formed by one set of seal rings 83 that form a seal between the boss 3b of the case 3 and the drum member 23.

The drum 21 of the clutch C1 is connected to the input shaft 2 and has an inner circumferential surface splined to friction plates 71. The clutch C1 is engaged by operation of the hydraulic servo 11. The friction plates 71 are intermeshed with plates splined to a hub 22 which is connected to the sun gear S2.

The drum 23 of the clutch C2 is also connected to the input shaft 2 and has an inner circumferential surface splied to friction plates 72 of the clutch C2 that are engaged by the hydraulic servo 12. The friction plates 72 are intermeshed with plates splined to a hub unit 24 which is connected to the carrier CR2.

On the radially outer side of the second planetary gear unit PU is a multi-disc brake B2 that includes a hydraulic servo 15, friction plates 75, and a hub 28. An end plate of the carrier CR2 of planetary gear unit PU is connected to a hub 28 that is splined to friction plates intermeshed with friction plates 75 of the brake B2, and this hub 28 is connected to the inner race of a one-way clutch F1. The sun gear S2 is meshed with the short pinion PS of carrier CR2, and the sun gear S3 and ring gear R3 are meshed with the long pinion PL of carrier CR2. Also, a linking member 27 is connected to one end of ring gear R3, and links ring gear R3 to the counter gear (output) unit 5.

As described above, the rear (first) planetary gear unit PR and the clutch C3 are arranged at one axial side of the planetary gear unit PU, and the clutches C1 and C2 are arranged on the other axial side of the planetary gear unit PU. The counter gear 5 is located axially between the first planetary gear unit PR and the second planetary gear unit PU. Further, the brake B1 is located on the radially outer side of the first planetary gear unit PR, and the brake B2 is located on the radially outer side of the second planetary gear unit PU.

Operations of the automatic transmission $_1$ will now be described with reference to FIG. 1, FIG. 2, and FIG. 3. The vertical axes of the speed line diagram of FIG. 3 indicate the speed of each rotary element, and the horizontal axis indicates the corresponding gear ratio of the rotary elements. In the second planetary gear unit PU section of this speed line diagram, the vertical axis on the right side of FIG. 3 corresponds to sun gear S3, and moving to the left within the diagram, the vertical axes correspond, in succession, to the carrier CR2, the ring gear R3, and the sun gear S2. On the first planetary gear unit PR section of this speed line diagram, the vertical axis on the right side of FIG. 3 corresponds to sun gear S1, and moving to the left within the diagram, the vertical axes correspond, in succession, to the ring gear R1 and the carrier CR1. Further, the widths between these vertical axes are inversely proportional to the number of teeth of each of the sun gears S1, S2, S3, and inversely proportional to the number of teeth of the ring gears R1, R3. The horizontal dotted line within the diagram illustrates rotation transmitted from the transmitting member 30.

As illustrated in FIG. 1, the rotation of input shaft 2 is input to the sun gear S2 by engagement the clutch C1. The rotation of input shaft 2 is input to the carrier CR2 by engagement of the clutch C2, and this carrier CR2 can be held against rotation by engagement of brake B2, and rotation is limited to one direction by the one-way clutch F1.

The sun gear S1 is connected to the input shaft 2 by engagement of the clutch C3 for receipt of the input rotation. Further, the carrier CR1 is connected to the case 3 and thereby fixed against rotation so that the rotation of the input shaft 2 input to the sun gear S1 causes the ring gear R1 to rotate at a reduced speed. The reduced speed rotation of this ring gear R1 is input to the sun gear S3 via the transmitting member 30. Further, when the clutch C3 is not engaged, and the brake B1 is engaged, the sun gear S3 is fixed against rotation via this transmitting member 30.

The rotation of the ring gear R3 is output to the above-mentioned counter gear 5, and from the counter gear 5 to the drive wheels via a counter shaft unit, not illustrated, and to a differential unit.

In first speed forward within the D (drive) range, as illustrated in FIG. 2, the clutch C1 and one-way clutch F1 are engaged. Then, as illustrated in FIG. 3, the rotation of input shaft 2 is input to the sun gear S2 via the clutch C1, and the rotation of the carrier CR2 is restricted to one direction (the forward rotation direction), in other words, the carrier CR2 is prevented from rotating in the opposite direction. Further, the rotation of input shaft 2 that is input to the sun gear S2 is output to the ring gear R3 via the fixed carrier CR2, and the forward rotation for first speed forward is output from the counter gear 5.

When downshifting (when coasting), the brake B2 is engaged and carrier CR2 is thereby fixed, and first speed forward is maintained. Further, in this first speed forward, the one-way clutch F1 prevents the carrier CR2 from rotation in the opposite direction and allows forward rotation, and therefore, switching from a non-running range to a running range and achieving the first speed forward can be accomplished more smoothly by the automatic engagement of the one-way clutch.

In second speed forward within D (drive) range, as illustrated in FIG. 2, the clutch C1 is engaged and the brake B1 is also engaged. Then, as illustrated in FIG. 3, the rotation of input shaft 2 is input to the sun gear S2 via the clutch C1, and the sun gear S3 is fixed by engagement of brake B1. In this state, the carrier CR2 slightly reduces rotational speed, the rotation of input shaft 2 that was input to the sun gear S2 is output to the ring gear R3 via the carrier CR2 at this reduced rotational speed, and the forward rotation for second speed forward is output from the counter gear 5.

In third speed forward within the D (drive) range, as illustrated in FIG. 2, the clutch C1 and the clutch C3 are engaged. Then, as illustrated in FIG. 3, the rotation of input shaft 2 is input to the sun gear S2 via the clutch C1. The rotation of input shaft 2 is also input to the sun gear S1 via the clutch C3, the ring gear R1 reduces the rotational speed due to non-rotation of the fixed carrier CR1, and the reduced speed of this ring gear R1 is output to the sun gear S3 via the transmitting member 30. Then, the carrier CR2 will have a slightly increased rotational speed compared to the rotational speed of sun gear S3 because of the rotation of the input shaft 2 input to the sun gear S2 and the reduced speed rotation of the sun gear S3. Further, the rotation of the input shaft 2 input into the sun gear S2 is output to the ring gear R3 via the carrier CR2 at the reduced rotational speed, and the forward rotation for third speed forward is output from the counter gear 5. In this case, because the sun gear S3 and the ring gear R1 rotate at a reduced speed, the transmitting member 30 transmits a relatively large torque.

In fourth speed forward within the D (drive) range, as illustrated in FIG. 2, the clutch C1 and the clutch C2 are engaged. Then, as illustrated in FIG. 3, the rotation of the input shaft 2 is input to the sun gear S2 via the clutch C1, and into the carrier CR2 via the clutch C2 to establish a state of directly coupled rotation, and the rotation of the input shaft 2 is output as is to the ring gear R3, and the forward rotation for fourth speed forward is output from the counter gear 5.

In fifth speed forward within the D (drive) range, as illustrated in FIG. 2, the clutch C2 and the clutch C3 are engaged. Then, as illustrated in FIG. 3, the rotation of the input shaft 2 is input to the carrier CR2 via the clutch C2 and to the sun gear S1 via the clutch C3, and the ring gear R1 rotates at a reduced speed, and the rotation of ring gear R1 is output at this reduced speed to the sun gear S3 via the transmitting member 30. Then, overdrive rotation due to the reduced rotational speed of the sun gear S3 and input to the carrier CR2 of the rotation of the input shaft, is output to the ring gear R3, and the forward rotation for fifth speed forward is output from the counter gear 5. In this case, similar to the case of the third speed forward, because the sun gear S3 and the ring gear R1 are rotating at a reduced speed, the transmitting member 30 transmits a relatively large torque.

In sixth speed forward within the D (drive) range, as illustrated in FIG. 2, the clutch C2 is engaged and the brake B1 is engaged. Then, as illustrated in FIG. 3, the rotation of the input shaft 2 is input to the carrier CR2 via the clutch C2, and the sun gear S3 is fixed by engagement of the brake B2. This causes overdrive rotation at a speed higher than that of the above-mentioned fifth speed forward, derived from the rotation of the input shaft 2 input to the carrier CR2 with the sun gear S3 fixed, to be output to the ring gear R3, and the forward rotation for sixth speed forward is output from the counter gear 5.

In first speed reverse within R (reverse) range, as illustrated in FIG. 2, the clutch C3 and the brake B2 are engaged. Then, as illustrated in FIG. 3, the rotation of the input shaft 2 is input to the sun gear S1 via the clutch C3, and the ring gear R1 rotates at a decreased speed with the carrier CR1 fixed, and the rotation of this ring gear R1 is output to the sun gear S3 via the transmitting member 30. Further, the carrier CR2 is fixed by engagement of the brake B2. Then, the rotation of the sun gear S3 at reduced speed with the carrier CR2 fixed is output to the ring gear R3 as reverse direction rotation, and the reverse direction rotation for first speed reverse is output from the counter gear 5. In this case, similar to the cases of the third speed forward and fifth speed forward, because the sun gear S3 and the ring gear R1 are rotating at a reduced speed, the transmitting member 30 transmits a relatively large torque.

In P (parking) and N (neutral), the clutch C1, clutch C2, and clutch C3 are released, transmission between the input shaft 2 and the counter gear 5 is disconnected, and the automatic transmission $_1$ as a whole is in an idle state (neutral state).

Figure 3:
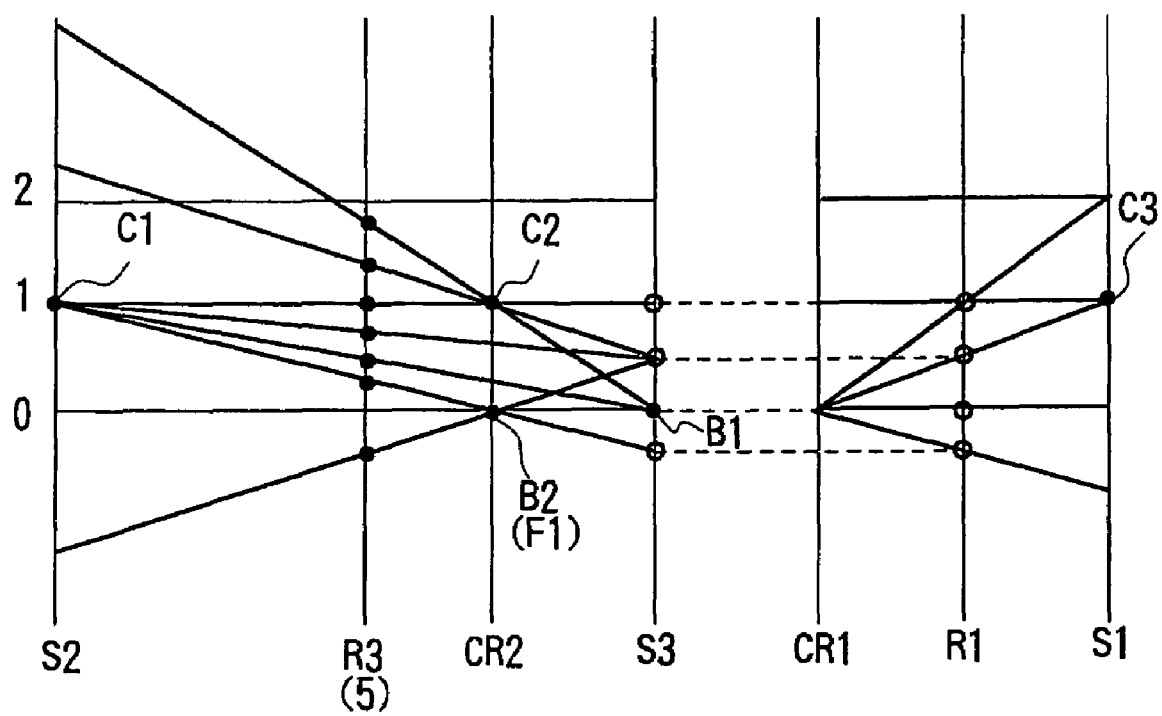
FIG. 3 is a speed line diagram of the automatic transmission of the first embodiment.

As illustrated in FIG. 2 and FIG. 3, in first speed forward, second speed forward, fourth speed forward, and sixth speed forward, in the planetary gear PR, the rotation of the sun gear S3 is input to the ring gear R1 via the transmitting member 30, and further, because the clutch C3 is released as illustrated in FIG. 3, the sun gear S1 rotates based on the rotation of ring gear R1 and the fixed state of carrier CR1.

As described above, in the automatic transmission $_1$ of the present invention, the planetary gear PR and the clutch C3 are arranged on one axial side of the planetary gear unit PU, and the clutch C1 and the clutch C2 are arranged on the other axial side of the planetary gear unit PU, and the automatic transmission can provide six forward speeds and one reverse speed with direct coupling in fourth speed forward. For example, compared to a transmission wherein the clutch C1 or clutch C2 is located between the first planetary gear unit PR and the second planetary gear unit PU, the first planetary gear unit PR and the second planetary gear unit PU can be located closer together, and the transmitting member 30 which transmits the reduced speed rotation can be made relatively shorter. Therefore, the automatic transmission can be made more compact and lightweight, and further, because the inertia (inertial force) can be reduced, the controllability of the automatic transmission can be improved, and the occurrence of speed change shock can be reduced.

Further, the clutch C3 is located on one axial side of the second planetary gear unit PU, and the clutch C1 and the clutch C2 are located on the other axial side of the second planetary gear unit PU. Therefore, compared to the case wherein for example three clutches C1, C2, and C3 are arranged on one side of the second planetary gear unit PU, the construction of oil lines (for example, 2a, 2b, 92, 93, 94) for providing oil to the hydraulic servos 11, 12, and 13 for these clutches C1, C2, C3 becomes easier, the manufacturing process is simplified and the costs reduced.

Further, because the hydraulic servos 11 and 13 are provided on the input shaft 2, two sets of seal rings 81 and 82 seal the case 3 to the oil lines 2a and 2b provided within input shaft 2, and therefore oil can be supplied to the oil compartment of hydraulic servos 11 and 13 without providing seal rings between, for example, the input shaft 2 and the hydraulic servos 11 and 13. Further, the hydrualic servo 12 can be supplied with oil directly from the boss 3b, without passing through other units for example, by provision of the one set of seal rings 83. Therefore, oil can be supplied simply by providing one set of seal rings 81 and 82, 83 each for the oil pressure servos 11, 12, and 13, and because sliding resistance from seal rings is minimized, the efficiency of the automatic transmission is improved.

The clutch C1 is a clutch that engages at relatively slow to medium speeds, i.e., in first speed forward, second speed forward, third speed forward, and fourth speed forward, and is released at fifth speed forward, sixth speed forward, or first speed reverse, which are relatively high speeds. The hub 22 that connects clutch C1 and sun gear S2 rotates at a relatively high speed or in reverse (see FIG. 3). On the other hand, with the transmitting member 30 rotating at a reduced speed in fifth speed forward or first speed reverse, and when the transmitting member is fixed at sixth speed forward, the difference between the rotational speeds of the hub unit 22 and the transmitting member 30 may become large. However, because this clutch C1 is located on the opposite side of the planetary gear unit PU, the hub unit 22 and the transmitting member 30 can be spaced apart and, compared with the case wherein for example those units are configured in a multi-axial construction, the decrease in efficiency of the automatic transmission, which would otherwise result from the relative rotation occurring because of friction between those units, can be prevented.

Further, since the counter gear 5 is axially intermediate the second planetary gear unit PU and the first planetary gear unit PR, the counter gear 5 can be in approximately the axial center of the automatic transmission. For example, when the automatic transmission is mounted on the vehicle, enlargement in one axial direction (particularly in the rear direction where the input from the drive source is at the axial front) can be avoided because the counter gear 5 is mounted adjacent the drive wheel transmission mechanism. Because of this, particularly in the case of a FF vehicle, the interference with the front wheels is reduced, mountability on a vehicle is improved, and the steering angle is improved.

Further, in the event that the hydraulic servo 13 adjoins the first planetary gear unit PR, for example, and the hub unit 26 serves as the cylinder for the hydraulic servo 13, it becomes necessary to provide one set of seal rings between the hub 26 and the input shaft 2. However, the hydraulic servo 13 of the clutch C3 is located on the side of the friction plates 73 axially opposite the planetary gear PR and, therefore, seal rings are not provided, and thus the number of seal rings is reduced, sliding resistance is reduced, and by doing so the efficiency of the automatic transmission is improved.

Because the automatic transmission $_1$ according to the first embodiment is directly coupled in fourth speed forward, in fifth speed forward and in sixth speed forward, the gear ratio can be a high ratio, and particularly when the vehicle is running at a high speed, the engine speed can be reduced to quiet the vehicle while running at a high speed.

Japanese Unexamined Patent Application Publication No. 8-68456 proposes a construction wherein a clutch is located in the path of reduced speed transmission from the reducing ("rear") planetary gear unit to the input rotary element of the front planetary gear unit, and because of the large torque transmitted along this path, the clutch or members that transmit the torque must be constructed so as to withstand this large torque. In other words, the number of friction members of a clutch must be increased, or the size thereof increased, or the hydraulic servo for operating the clutch must be made larger. Further, because a brake must be designed to hold the rotary element of the planetary gear unit against rotation this proposed automatic transmission could not be made sufficiently compact. Therefore, it is an object of the present embodiment to provide an automatic transmission that solves the above-mentioned problems, by constructing a compact clutch and brake in the area of the reducing planetary gear unit.

Therefore, in the automatic transmission $_1$ of the present embodiment, the clutch C3 is located between the input shaft 2 and the sun gear S1, and therefore, compared to the case wherein the clutch C3 is located for example between the ring gear R1 and the sun gear S3, the load on the clutch C3 is decreased, and the clutch C3 can be made more compact. Further, because the friction members and hydraulic servo of the clutch C3 can be made smaller, these members can be located on the radially inner side of the brake B1, and the automatic transmission can be made more compact.

Second Embodiment

Figure 4:
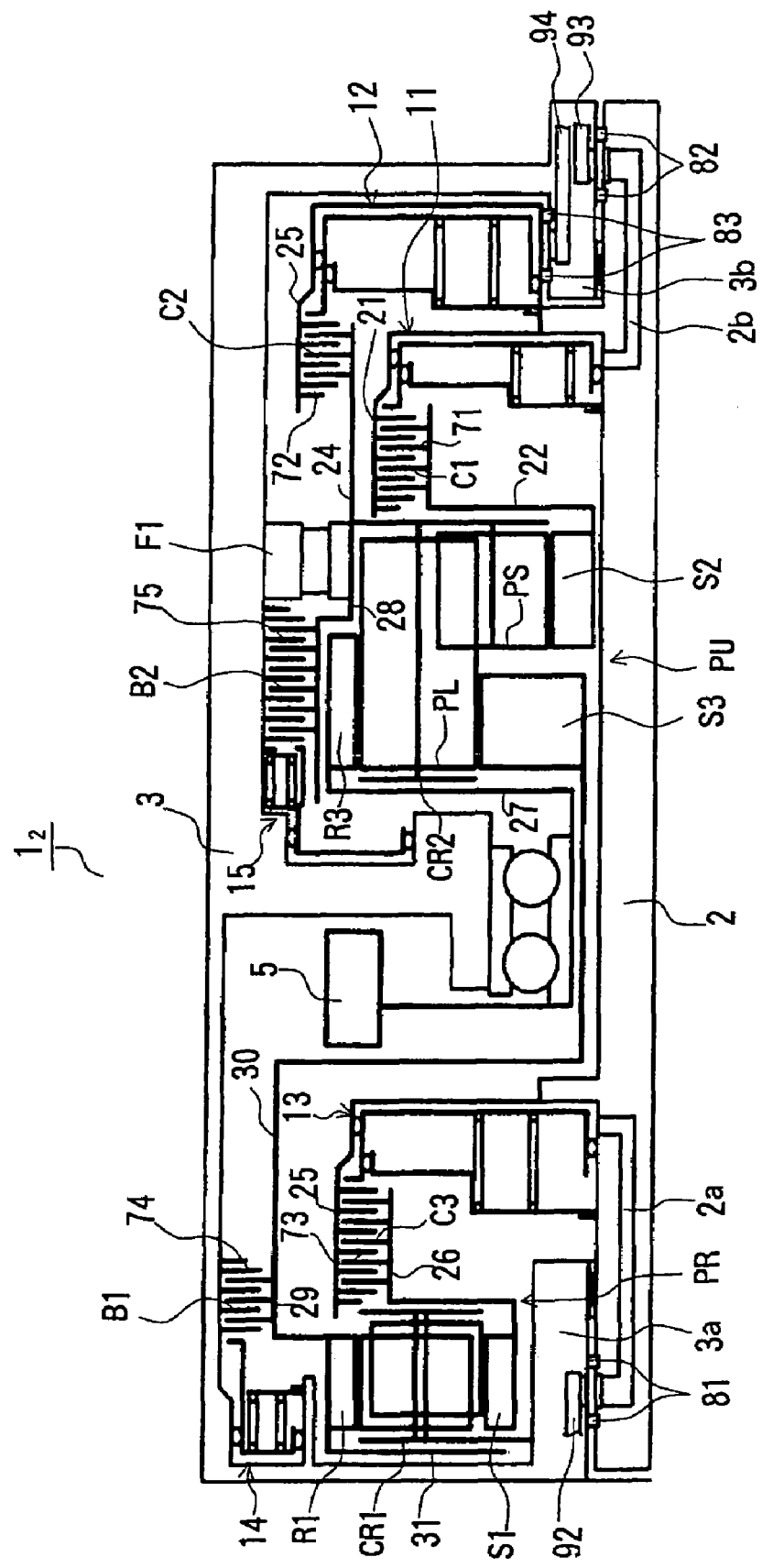
FIG. 4 is a schematic cross-sectional view of an automatic transmission according to a second embodiment.

A second embodiment, which is a partial modification of the first embodiment, will be described with reference to FIG. 4. FIG. 4 is a schematic cross-sectional diagram of the automatic transmission of the second embodiment. Components of the second embodiment which are the same as those of the first embodiment are denoted by the same reference numerals in FIG. 4, and description thereof omitted, except for those components partially modified.

As FIG. 4 illustrates, the automatic transmission $_2$ of the second embodiment has the input and output ends the reverse of the automatic transmission $_1$ of the first embodiment (see FIG. 1). However, the operations establishing the first speed forward through the sixth speed forward and the first speed reverse are similar (see FIG. 2 and FIG. 3).

As shown in FIG. 4, in the automatic transmission $_2$ of the second embodiment, the first planetary gear unit PR and the clutch C3 are located at one axial end of the planetary gear unit PU, and the clutch C1 and the clutch C2 are located at the other axial end of the planetary gear unit PU, and therefore the transmission is directly coupled in fourth speed forward, and can provide six forward speeds and one reverse speed. The planetary gear unit PR and the planetary gear unit PU can be located closer together, as compared to the case wherein for example the clutch C1 and the clutch C2 are located between the planetary gear PR and the planetary gear unit PU, and the transmitting member 30 for transmitting the reduced rotation can be made relatively shorter. Therefore, the automatic transmission can be made compact and lightweight, and further, because the inertia (inertial force) can be reduced, the controllability of the automatic transmission can be improved, and the occurrence of speed change shock can be reduced.

Further, because the clutch C3 is located at one axial side of the second planetary gear unit PU and the clutch C1 and the clutch C2 are located at the other axial side of the second planetary gear unit PU, as compared to the case wherein the three clutches C1, C2, and C3 are located on one side of the second planetary gear unit PU for example, the construction of oil lines (for example, 2a, 2b, 92, 93, 94) which provide oil to the hydraulic servos 11, 12, and 13 for these clutches C1, C2, C3 can be more easily made, the manufacturing process can be simplified and the cost brought down.

Further, because the oil pressure servos 11 and 13 are provided on the input shaft 2, one set of seal rings 81 and 82 form a seal with the case 3 and supply oil to the oil lines 2a, and 2b provided within input shaft 2, and therefore oil can be supplied to the oil compartments of hydraulic servos 11 and 13 without providing seal rings between, for example, the input shaft 2 and the hydraulic servos 11 and 13. Further, the hydraulic servo 12 can receive supply of oil directly from the boss 3b, without passing through other units, utilizing only one set of seal rings 83. Therefore, oil can be supplied simply by providing one set of seal rings 81 and 82, 83 each for the oil pressure servos 11, 12, and 13, sliding resistance from the seal rings can be minimized, and therefore the efficiency of the automatic transmission can be improved.

Because, the clutch C1 engages at relatively slow to medium speeds, i.e., first speed forward, second speed forward, third speed forward, and fourth speed forward, and is released at fifth speed forward, sixth speed forward, and first speed reverse, which are relatively high speeds, the hub unit 22 that connects this clutch C1 with sun gear S2 rotates at a relatively high speed or in reverse (see FIG. 3), because the transmitting member 30 reduces the speed of rotation in fifth speed forward and first speed reverse, and because there may be cases wherein the transmitting member is fixed in sixth speed forward, the difference between rotational speeds of the hub 22 and the transmitting member 30 may become large. However, because clutch C1 is located on the side of the second planetary gear unit PU opposite the first planetary gear unit PR, the hub 22 and the transmitting member 30 can be spaced apart, and compared with the case wherein for example those units are in contact in a multi-axial design, the decrease in efficiency of the automatic transmission resulting from the relative rotation occurring because of friction between these units can be prevented.

Further, because the counter gear 5 is located axially intermediate the second planetary gear unit PU and the first planetary gear unit PR, the counter gear 5 can be located in approximately the axial center of the automatic transmission. For example, when the automatic transmission is mounted on a vehicle, enlargement in one axial direction (particularly in the rear direction when the input side which connects with the drive source is the "front") is not necessary because the counter gear 5 is mounted adjacent the drive wheel transmission mechanism. Because of this, particularly in the case of a FF vehicle, interference with the front wheels is reduced, and the mountability on a vehicle is improved, such that the steering angle, for example, is greatly improved.

Further, in the event that the hydrualic servo 13 is located adjoining the first planetary gear unit PR, for example, and the hub 26 serves as the cylinder of the hydraulic servo 13, it becomes necessary to provide one set of seal rings between the hub 26 and the input shaft 2. However, in this second embodiment the hydraulic servo 13 of the clutch C3 is located on the side of the friction plates 73 axially opposite the first planetary gear unit PR, and therefore seal rings are omitted, the total number of seal rings is reduced, sliding resistance is reduced, and thus the efficiency of the automatic transmission is improved.

Further, the automatic transmission $1_2$ of the present embodiment is directly coupled in fourth speed forward. Therefore, in fifth speed forward and sixth speed forward, the gear ratio can be a high ratio, and particularly when the vehicle is running at a high speed, the engine speed can be lowered, allowing the vehicle to run more quietly at high speed.

In the automatic transmission $1_2$ of this second embodiment, because the clutch C3 is located between the input shaft 2 and the sun gear S1, compared to the case wherein the clutch C3 is located for example between the ring gear R1 and the sun gear S3, the load on the clutch C3 can be decreased, and the clutch C3 can be made more compact. Further, because the friction members and hydraulic servo of the clutch C3 can be made smaller, they can be located on the radially inner side of the brake B1, and the automatic transmission can be made more compact.

Third Embodiment

The third embodiment, which is a partial modification of the first embodiment will be described with reference to FIG. 5 through FIG. 7. Components of the third embodiment which are the same as those of the first embodiment are denoted by the same reference numerals in FIGS. 5-7, and description thereof omitted, except for those components partially modified.

Figure 5:
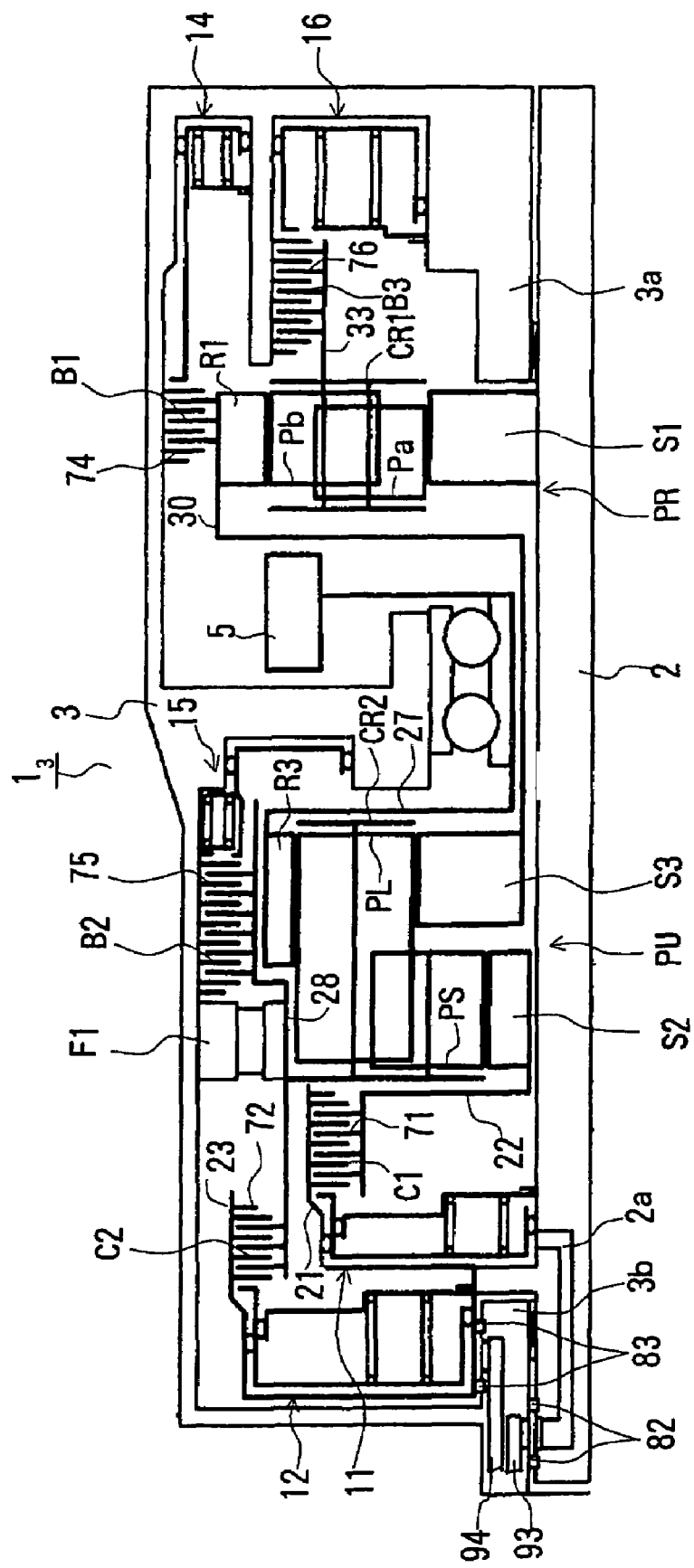
FIG. 5 is a schematic cross-sectional view of a third embodiment of an automatic transmission according to the present invention.

As FIG. 5 illustrates, the automatic transmission $1_3$ of the third embodiment differs from the first embodiment in the configuration of the planetary gear unit PR, in that a brake B3 (the first brake) replaces the clutch C3, and in that the carrier CR1 of the first planetary gear unit PR is modified so as to be capable of being fixed by the brake B3.

In this third embodiment brake B3 is located on the side of the first planetary gear unit PR opposite the second planetary gear unit PU (right side of diagram). This brake B3 comprises a hydraulic servo 16, friction plates 76, and a hub 33. Further, the brake B1 is located radially outward of the brake B3.

The hub 33 of brake B3 is connected to one side plate of the carrier CR1, and carrier CR1 is rotatably supported by the input shaft 2 or the boss 3a. Further, the sun gear S1 is connected to the input shaft 2. Also, the friction plates 74 of the brake B1 are splined to the outer circumferential surface of the ring gear R1, and also this ring gear R1 is connected to the sun gear S3 via the transmitting member 30. In other words, the ring gear R1 and the sun gear S1 are constantly connected with one another, with no clutch located therebetween, for constant transmission of the rotation.

The operations of the automatic transmission $1_3$ will now be described with reference to FIG. 5, FIG. 6, and FIG. 7 below. Similar to the above-mentioned first embodiment, the vertical axes of the speed line diagram illustrated in FIG. 7 indicate the speed of rotation of each rotary element, and the horizontal axis indicates the corresponding gear ratio of these rotary elements. In the second planetary gear unit PU section of this speed line diagram, the vertical axis at the right side of FIG. 7 corresponds to sun gear S3, and moving to the left within the diagram, the vertical axes correspond to the carrier CR2, the ring gear R3, and the sun gear S2. In the first planetary gear unit PR section of this speed line diagram, the vertical axes at the right side of FIG. 7 correspond to sun gear S1, and hereafter moving to the left within the diagram, the vertical axes correspond to the ring gear R1 and the carrier CR1. Further, the widths between these vertical axes are inversely proportional to the number of teeth of each of the sun gears S1, S2, S3, and to the number of teeth of each of the ring gears R1, R3. Also, the dotted line in a horizontal direction within the diagram represents rotation transmitted from the transmitting member 30.

As illustrated in FIG. 5, the carrier CR1 is fixed to the case 3 by engagement of the brake B3. Further, the rotation of the input shaft 2 is input to the sun gear S1, and the ring gear R1 rotates at a speed reduced from that of the input shaft 2 which is input to sun gear S1, with carrier CR1 being fixed. Thus, the reduced speed rotation of the ring gear R1 is input to the sun gear S3 via the transmitting member 30, by engagement of the brake B3.

Figure 7:
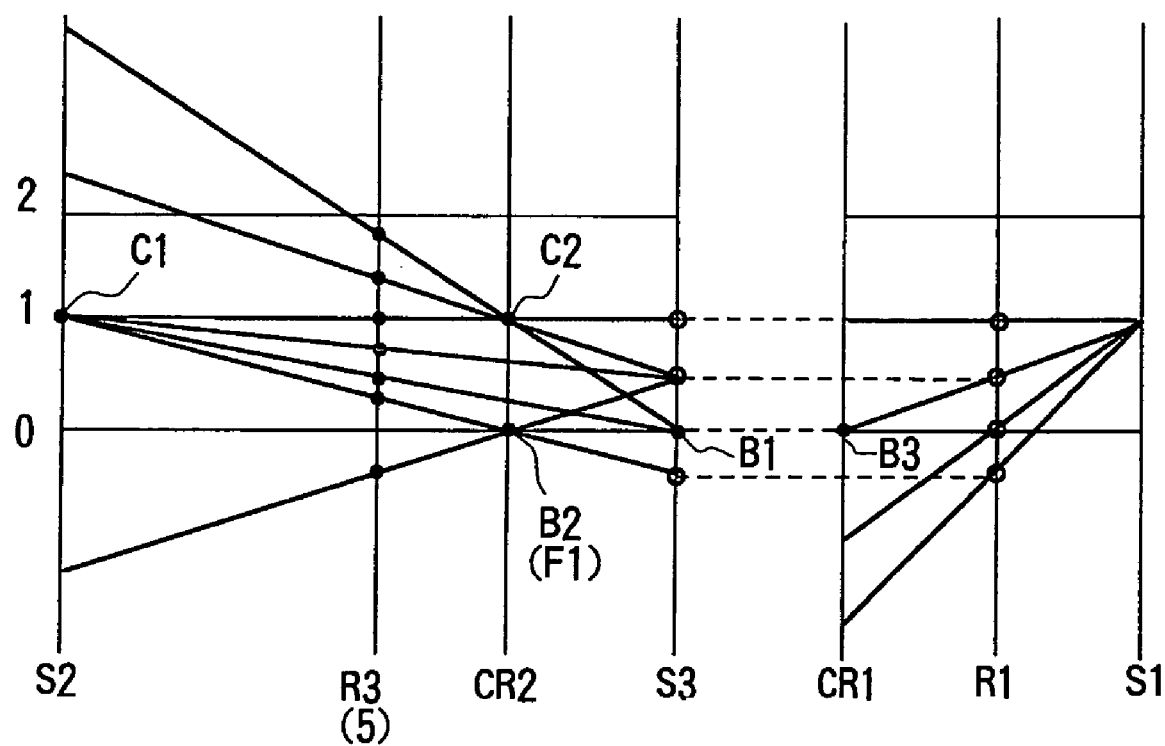
FIG. 7 is a speed line diagram for the automatic transmission of the third embodiment.

As FIG. 6 and FIG. 7 illustrate, in the first planetary gear unit PR, in third speed forward, fifth speed forward, and first speed reverse, the rotation of the input shaft 2 is input to the sun gear S1 by engaging the brake B3 to fix the carrier CR1, and the reduced speed rotation is output to the ring gear R3 by the rotation of the sun gear S1 which is input from the input shaft 2, and the reduced speed rotation is input to the sun gear S3 via the transmitting member 30. Because the ring gear R1 and the sun gear S3 are rotating at a reduced speed, transmitting member 30 transmits a relatively large torque. On the other hand, in first speed forward, second speed forward, fourth speed forward, and sixth speed forward, the rotation of the sun gear S3 is input to the ring gear R1 via the transmitting member 30, and further, because the brake B3 is released, as FIG. 7 illustrates, the carrier CR1 rotates at a speed based on both the rotational speed of ring gear R1 and the rotational speed of sun gear S1 input from input shaft 2.

Operations other than those of the first planetary gear unit PR described above are similar to those of the first embodiment (see FIG. 2 and FIG. 3), and, accordingly, description thereof will be omitted.

As described above, in the automatic transmission $1_3$ of this third embodiment, the first planetary gear unit PR and the brake B3 are located on one axial side of the second planetary gear unit PU, and the clutch C1 and the clutch C2 are located on the other axial side of the second planetary gear unit PU. Therefore, the automatic transmission can provide six forward speeds and one reverse speed, with direct coupling in fourth speed forward. For example, compared to the case wherein the clutch C1 or clutch C2 is located between the first planetary gear unit PR and the second planetary gear unit PU, the first planetary gear unit PR and the second planetary gear unit PU can be located closer together, and the transmitting member 30 for transmitting the reduced rotation can be made relatively short. Therefore, the automatic transmission can be made more compact and lightweight, and further, because the inertia (inertial force) can be reduced, the controllability of the automatic transmission can be improved, and the occurrence of speed change shock can be reduced.

Further, because the hydraulic servo 11 is provided on the input shaft 2, one set of seal rings 82 form a seal with the case 3 and provide a connection for supply of oil from the oil lines 2b provided within input shaft 2 to the oil compartment of hydraulic servo 11 without any seal rings between, for example, the input shaft 2 and the hydraulic servo 11. Further, hydraulic servo 12 can receive supply of oil directly from the boss 3b without passing through other units for example. In other words, supply of oil is provided by a connection formed with one set of seal rings 83. Therefore, oil can be supplied simply by providing one set of seal rings 82, 83 for each of the hydraulic servos 11, 12, sliding resistance from the seal rings can be minimized, and therefore the efficiency of the automatic transmission can be improved.

Further, because the clutch C1 engages at relatively slow to medium speeds, i.e., first speed forward, second speed forward, third speed forward, and fourth speed forward, and is released in fifth speed forward, sixth speed forward, and first speed reverse, which are relatively high speed levels, the hub unit 22 that connects this clutch C1 and sun gear S2 rotates at a relatively high speed or in reverse (see FIG. 7). Because the transmitting member 30 rotates at a reduced speed in fifth speed forward and in first speed reverse, and because there may be cases wherein the transmitting member is fixed in sixth speed forward, the difference in speed of rotation between the hub 22 and the transmitting member 30 may become large. However, because the present invention locates this clutch C1 on the side of the second planetary gear unit PU opposite the first planetary gear unit PR, the hub 22 and the transmitting member 30 can be spaced further apart, as compared with the case wherein for example those units are in contact with a multi-axial construction, and the decrease in efficiency of the automatic transmission resulting from the relative rotation occurring because of friction between those units can be prevented.

Further, due to the counter gear 5 being located axially intermediate the second planetary gear unit PU and the first planetary gear unit PR, the counter gear 5 can be located at approximately the axial center of the automatic transmission. For example, when the automatic transmission is mounted on a vehicle, enlargement in one axial direction (particularly in the rear direction when the side which receives input from the drive source is the "front") becomes unnecessary because the counter gear 5 is mounted to adjoin the drive wheel transmission mechanism. Because of this, particularly in the case of a FF vehicle, interference with the front wheels is reduced, the mountability on a vehicle can be improved, and the steering angle can be greatly improved.

Further, because the reduced speed rotation output to the second planetary gear unit PU from the first planetary gear unit PR is controlled by engagement and disengagement of the brake B3, the number of parts (for example drums and so forth) can be reduced compared to the case where, for example, a clutch C3 is provided. Further, the brake B3 can be operated by oil received directly from a line in the case 3, and therefore the construction of an oil line can be simplified as compared to the case wherein, for example, a clutch C3 is provided.

Further, the automatic transmission $1_3$ according to this third embodiment is directly coupled in fourth speed forward. Therefore, in fifth speed forward and sixth speed forward, the gear ratio can be a high ratio, and particularly for high vehicle speeds, the engine speed can be lower, and this makes the vehicle more quiet while running at a high speed.

By providing a compact clutch and brake in the area of the reducing planetary gear unit, this embodiment also provides an automatic transmission that is more compact overall.

In the automatic transmission $1_3$ of the present embodiment, the carrier CR1 is fixed by the brake B3, and therefore, compared to the case wherein the clutch is located between the ring gear R1 and the sun gear S3 for example, the load on the brake B3 can be reduced, and the friction members of the brake B3 and its hydraulic servo can be made smaller. Therefore, these elements can be located radially inward of the brake B1, and the automatic transmission can be made more compact.

Fourth Embodiment

Figure 8:
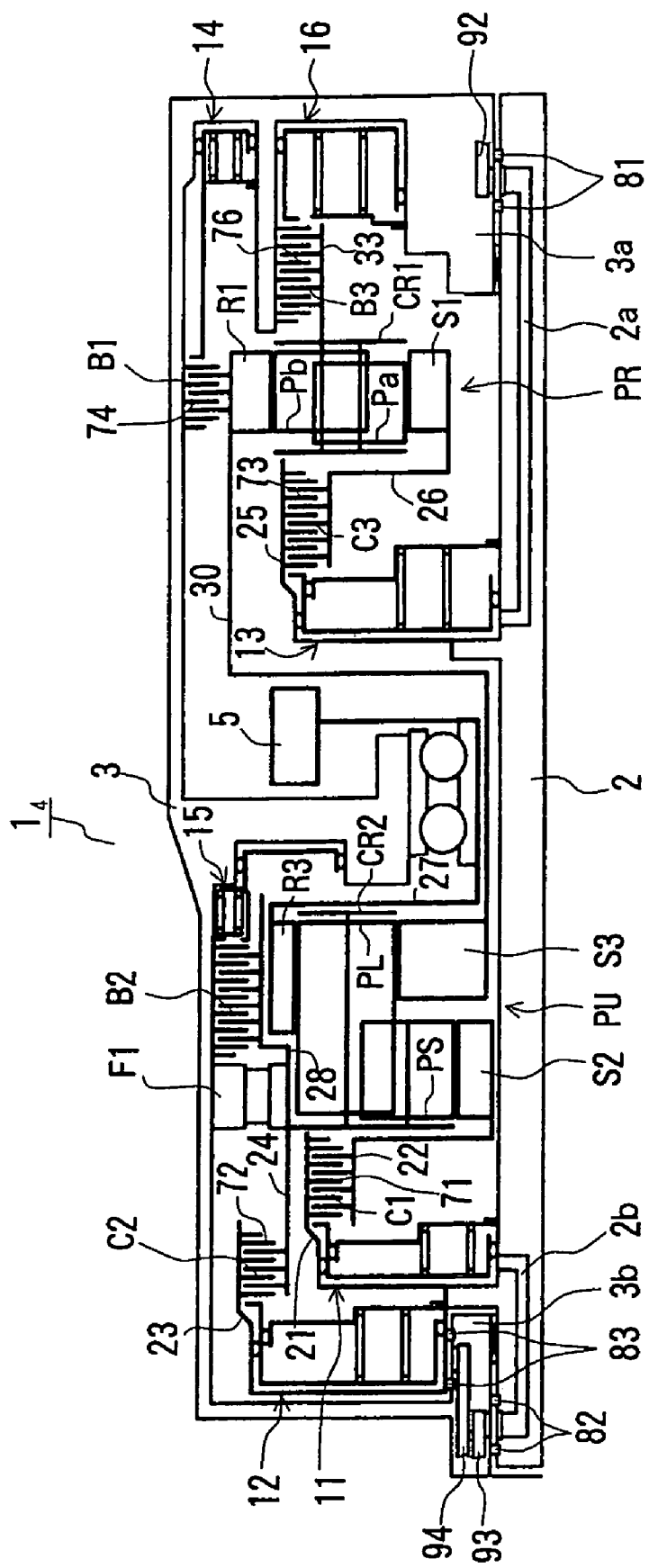
FIG. 8 is a schematic cross-sectional view of a fourth embodiment of an automatic transmission according to the present invention.
Figure 10:
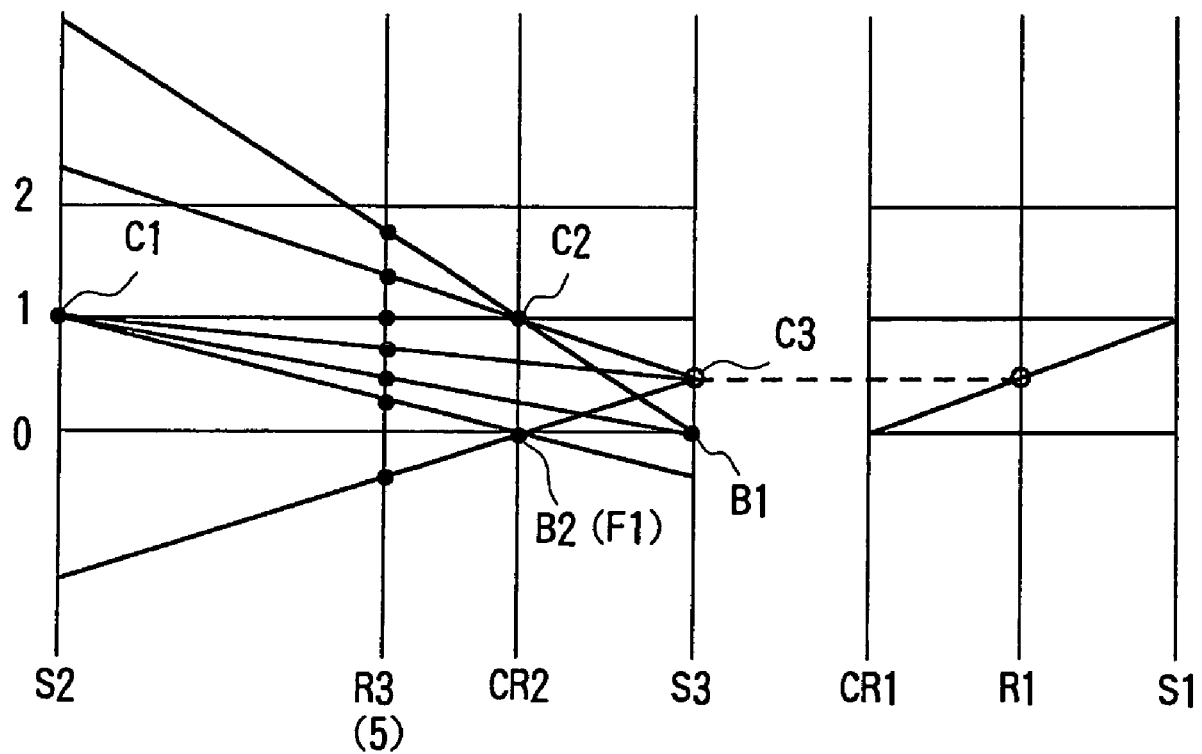
FIG. 10 is a speed line diagram of an automatic transmission according to the fourth embodiment.

The fourth embodiment, which is a partial modification of the first embodiment will be described with reference to FIG. 8 through FIG. 10. In FIGS. 8-10 components of the fourth embodiment which are the same as those of the first embodiment are denoted by the same reference numerals, and description thereof will be omitted, except for the partial modifications.

As FIG. 8 illustrates, the automatic transmission $1_4$ of the fourth embodiment differs in the configuration of the first planetary gear unit PR as compared to that of the automatic transmission $1_1$ of the first embodiment (see FIG. 1), and further, a brake B3 is added, and rotation of the input shaft 2 is input to the sun gear S1 of the first planetary gear unit PR by the clutch C3 and the carrier CR1 can be fixed against rotation by the brake B3.

The clutch C3 is located on the planetary gear unit PU side (left side of diagram) of the first planetary gear unit PR, and the brake B3 is located on the side of the first planetary gear unit PR opposite the second planetary gear unit PU (right side of diagram). The inner circumferential surface of the forward portion of the drum 25 of this clutch C3 is splined to the friction plates 73, and these friction plates 73 are intermeshed with friction plates splined to the hub 26. The drum member 25 is connected to the input shaft 2, and the hub 26 is connected to the sun gear S1.

Brake B3 includes a hydraulic servo 16, friction plates 76, and a hub 33. The friction plates 76 are splined to the outer circumferential surface of the hub 33, the hub 33 is connected to one side plate of the carrier CR1, and carrier CR1 is rotatably supported by the input shaft 2 or the boss 3a. Also, the friction plates 74 of the brake B1 are splined to the outer circumference side of the ring gear R1, and this ring gear R1 is connected to the sun gear S3 via transmitting member 30. In other words, the ring gear R1 and the sun gear S3 are constantly connected with one another, with no clutch located therebetween, and the rotation is constantly transmitted.

The operations of the automatic transmission $1_4$ will now be described with reference to following FIG. 8, FIG. 9, and FIG. 10 below. Similar to the first embodiment, the vertical axes of the speed line diagram illustrated in FIG. 10 indicate the speed of each rotary element, and the horizontal axis indicates the corresponding gear ratios of these rotary elements. In the second planetary gear unit PU section of this speed line diagram, the vertical axes farthest right side of FIG. 10 correspond to sun gear S3 and, moving to the left within the diagram, the vertical axes correspond, in succession, to the carrier CR2, the ring gear R3, and the sun gear S2. In the first planetary gear unit PR section of this speed line diagram, the vertical axis to the farthest right side of FIG. 10 corresponds to sun gear S1 and, moving to the left within the diagram, the vertical axes consecutively correspond to the ring gear R1 and the carrier CR1. Further, the widths between these vertical axes are inversely proportional to the number of teeth of each of the sun gears S1, S2, S3, and to the number of teeth of each of the ring gears R1, R3. Also, the dotted line extending horizontally within the diagram represents rotation transmitted by the transmitting member 30.

As FIG. 8 illustrates, the rotation of input shaft 2 is input to the sun gear S1 by engaging the clutch C3. Further, the carrier CR1 is fixed to the case 3 by engagement of the brake B3. Therefore, when the clutch C3 and the brake B3 are engaged, the above-mentioned ring gear R1 rotates at a rotational speed reduced from that of the rotation of input shaft 2 which is input to this sun gear S1. In other words, by engaging the clutch C3 and the brake B3, the reduced speed rotation of the ring gear R1 is input to the sun gear S3 via the transmitting member 30.

As FIG. 9 and FIG. 10 illustrate, in the first planetary gear unit PR, at third speed forward, fifth speed forward, and first speed reverse, the rotation of the input shaft 2 is input to the sun gear S1 by engaging the clutch C3, and further, the carrier CR1 is fixed by engagement of the brake B3, and therefore the reduced speed rotation is output to the ring gear R3 due to fixation of the carrier CR1, and the reduced speed rotation is input to the sun gear S3 via the transmitting member 30. In this case, the ring gear R1 and the sun gear S3 are rotating at the reduced speed and, therefore, the transmitting member 30 transmits a relatively large torque. On the other hand, in first speed forward, second speed forward, fourth speed forward, and sixth speed forward, the rotation of the sun gear S3 is input to the ring gear R1 via the transmitting member 30, but because the clutch C3 and the brake B3 are released, the carrier CR1 and the sun gear S1 rotate.

The operations of the first planetary gear unit, other than those mentioned above, are similar to those of the first embodiment (see FIG. 2 and FIG. 3), and, accordingly, description thereof will be omitted.

As described above, in the automatic transmission $1_4$ of this fourth embodiment, the first planetary gear unit PR, the clutch C3, and the brake B3 are located on one axial side of the second planetary gear unit PU, and the clutch C1 and the clutch C2 are located on the other axial side of the second planetary gear unit PU, thereby providing an automatic transmission having six forward speeds and one reverse speed with direct coupling in fourth speed forward. For example, compared to the case wherein a clutch C1 or clutch C2 is located between the first planetary gear unit PR and the second planetary gear unit PU, the first planetary gear unit PR and the second planetary gear unit PU can be located closer together, and the transmitting member 30 which transmits the reduced speed rotation can be made relatively shorter. Therefore, the automatic transmission can be made more compact and lightweight, and further, because the inertia (inertial force) can be reduced, the controllability of the automatic transmission can be improved, and the occurrence of speed change shock can be reduced.

Further, because the clutch C3 is located on one axial side of the second planetary gear unit PU, and the clutch C1 and the clutch C2 are located on the other axial side of the second planetary gear unit PU, compared to the case wherein the three clutches C1, C2, and C3 are located on one side of the second planetary gear unit PU, the construction of the oil lines (for example, 2a, 2b, 92, 93, 94) which provide oil to the hydraulic servos 11, 12, and 13 for these clutches C1, C2, C3 is simplified and the costs brought down.

Further, because the oil pressure servos 11 and 13 are provided on the input shaft 2, one set of seal rings 81 and 82 provide a seal with the case 3 and connection to the oil lines 2a, and 2b provided within input shaft 2, and therefore oil can be supplied to the oil compartments of hydraulic servos 11 and 13 without providing seal rings between, for example, the input shaft 2 and the hydraulic servos 11 and 13. Further, the hydraulic servo 12 can supply oil from the boss 3b, without passing through other units. Therefore, the oil supply can be connected simply by providing one set of seal rings 81 and 82, 83 respectively for the hydraulic servos 11, 12, and 13, sliding resistance from the seal rings can be minimized, and therefore the efficiency of the automatic transmission can be improved.

Further, because the clutch C1 engages at relatively slow to medium speeds, i.e., first speed forward, second speed forward, third speed forward, and fourth speed forward, and released in fifth speed forward, sixth speed forward, and first speed reverse, which are relatively high speeds, the hub unit 22 that connects clutch C1 and sun gear S2 rotates at a relatively high speed or in reverse (see FIG. 3), and because the transmitting member 30 rotates at reduced speed rotation in fifth speed forward and first speed reverse, there may be cases wherein the transmitting member is fixed at sixth speed forward, and the difference in rotational speed between the hub unit 22 and the transmitting member 30 may become large. However, because this clutch C1 is located on the side of the second planetary gear unit PU opposite the first planetary gear unit PR, the hub 22 and the transmitting member 30 can be spaced apart, and compared with the case wherein for example those units are in contact, within a multi-axial construction, a decrease in efficiency of the automatic transmission resulting from relative rotation because of friction between those units can be avoided.

Further, because the counter gear 5 is located axially intermediate the second planetary gear unit PU and the first planetary gear unit PR, the counter gear 5 can be located at approximately the axial center of the automatic transmission. For example, when the automatic transmission is mounted on a vehicle, enlargement in one axial direction, particularly toward the rear when the input from the drive source is at the "front", is not necessary because the counter gear 5 is mounted adjoining the drive wheel transmission mechanism. Because of this, particularly in the case of a FF vehicle, interference with the front wheels is reduced, mountability on a vehicle is improved, and the steering angle is improved.

If the hydraulic servo 13 is located adjoining the planetary gear unit PR, and the hub unit 26 is made to serve as the cylinder of the hydraulic servo 13, it becomes necessary to provide one set of seal rings between the hub 26 and the input shaft 2. However, the hydraulic servo 13 of the clutch C3 is located on the side of the friction plates 73 axially opposite the first planetary gear unit PR, seal rings are not needed so that the number of seal rings can be reduced, sliding resistance can be reduced, and by doing so, the efficiency of the automatic transmission can be improved.

Further, because the automatic transmission $1_4$ of the fourth embodiment is directly coupled in fourth speed forward, in fifth speed forward, and in sixth speed forward, the gear ratio can be a high ratio, and particularly running at high vehicle speeds, the engine speed can be reduced and the vehicle becomes more quiet running at a high speed.

By constructing a compact clutch and brake in the area of the reducing planetary gear unit, the present embodiment provides an automatic transmission which is more compact overall.

In the automatic transmission $1_4$ of this fourth embodiment, the clutch C3 is located between the input shaft 2 and the sun gear S1, and therefore, compared to an embodiment wherein the clutch C3 is located between the ring gear R1 and the sun gear S3, the load on the clutch C3 can be decreased, and the clutch C3 can be made more compact. Further, because the friction members and hydraulic servo of the clutch C3 can be made smaller, they can be located radially inward of the brake B1, and the automatic transmission can be made more compact.

While the first through fourth embodiments of the present invention have been described above as automatic transmissions having a torque converter, the invention is not so limited, and any motion starting device may be used that transmits the torque (rotation) at the start of movement. Further, while the above-described embodiments have the transmission of the invention mounted on a vehicle with an engine as a drive source, the invention is not so limited and any drive source may be used as a matter of course. For example, the transmission may be mounted on a hybrid vehicle. Further, while the above-described automatic transmission is favorably used in a FF vehicle, it is not limited to this, and can be used in a FR vehicle, a four-wheel drive vehicle, or vehicles with other types of drive systems.

Further, the reducing (first) planetary gear unit according to the above first through fourth embodiments has been described as one that reduces rotational speed of the ring gear by fixing the carrier while inputting the rotation of the input shaft into the sun gear, but the invention is not so limited, and may reduce rotational speed of the ring gear by fixing the sun gear while inputting the rotation of the input shaft into the carrier.

As described above, the automatic transmission according to the present invention can be advantageously mounted on vehicles such as automobiles, trucks, busses, and so forth, and is particularly suitable for use with vehicles which require a reduction in size and reduction in weight of the transmission for mounting on the vehicle, and further require reduction of speed change shock.

The invention claimed is:

1. An automatic transmission for a vehicle comprising:
a rotatably driven input shaft;
a decelerating first planetary gear unit comprising an input rotary component that receives as input the rotation of said input shaft, a decelerated rotary component that rotates at a speed decelerated from the speed of rotation of the input rotary component and an intermediate component for transfer of rotation from said input rotary component to said decelerated rotary component;
a second planetary gear unit comprising a first rotary element, a second rotary element, a third rotary element and a fourth rotary element, said second planetary gear unit receiving input of the decelerated rotation of said decelerated rotary component;
a first clutch for connecting and disconnecting said input shaft to and from said second rotary element;
a second clutch for connecting and disconnecting said input shaft to and from said third rotary element;
a third clutch, located between said input shaft and said input rotary component, for operating the rotation of said input rotary component;
a first brake for braking said intermediate component; and
an output member for outputting the rotation of said fourth rotary element to drive wheels of the vehicle;
wherein said automatic transmission provides at least five forward speeds and one reverse speed, and said first clutch and said second clutch are engaged together in fourth speed forward;
wherein said first planetary gear unit and said third clutch are located on one axial side of said second planetary gear unit;
wherein said first clutch and said second clutch are located on a side of said second planetary gear unit axially opposite said one side; and
wherein said output member is disposed between (1) said second planetary gear unit and (2) said first planetary gear unit and said third clutch.

2. An automatic transmission according to claim 1, further comprising a second brake for fixing the first rotary element, said first rotary element receiving input of the decelerated rotation;
wherein said second brake and said third clutch each comprise friction members and a hydraulic servo for engaging said friction members; and
wherein the friction members of said third clutch are disposed radially inward of the friction members of said second brake.

3. An automatic transmission according to claim 1, wherein said third clutch is located between said first planetary gear unit and said output member; and
wherein said third clutch includes a hub oriented to open toward said first planetary gear unit.

4. An automatic transmission according to claim 1, further comprising:
a transmitting unit for linking said decelerated rotary component and said first rotary element; and
wherein said third clutch is located radially inward of said transmitting unit.

5. An automatic transmission according to claim 1, wherein said third clutch is operated by a hydraulic servo on said input shaft in communication with an oil path in said input shaft.

6. An automatic transmission according to claim 1, wherein said third clutch comprises:
friction members and a hydraulic servo for said third clutch, wherein said hydraulic servo for said third clutch is located on the side of said friction members axially opposite said first planetary gear unit; and
a drum member connected to said input shaft.

7. An automatic transmission according to claim 1, further comprising:
a second brake for fixing said first rotary element, wherein said decelerated rotation is input to said first rotary element, and wherein said engaging means radially overlaps said second brake.

8. An automatic transmission according to claim 1, wherein said first clutch is engaged in slow to medium speeds.

9. An automatic transmission according to claim 1, wherein said first clutch comprises friction members, a hydraulic servo that engages said friction members, a clutch drum and a hub unit; and
wherein said drum is connected to said input shaft, and said hub unit is connected to said second rotary element.

10. An automatic transmission according to claim 1 further comprising:
a transmitting member that connects said decelerated rotary component of said first planetary gear unit and said first rotary element of said second planetary gear unit, said transmitting member including an axially extending portion located radially inward of said output member.

11. An automatic transmission for a vehicle comprising:
a rotatably driven input shaft;
a decelerating first planetary gear unit comprising an input rotary component that receives as input the rotation of said input shaft, a decelerated rotary component that rotates at a speed decelerated from the speed of rotation of the input rotary component and an intermediate component for transfer of rotation from said input rotary component to said decelerated rotary component;
engaging means for controlling the rotation of said input rotary component or the rotation of said intermediate component;
a multiple type second planetary gear unit comprising:
a long pinion;
a short pinion which meshes with said long pinion;
a first sun gear which meshes with said long pinion, which receives as input the decelerated rotation of said decelerated rotary component, and which is fixed against rotation by engagement of a second brake;

a second sun gear which receives input of rotation from said input shaft by engagement of said first clutch and which meshes with said short pinion;

a carrier which receives input of rotation from said input shaft by engagement of said second clutch, and which is fixed against rotation by engagement of a third brake; and a ring gear linked to said output member and meshing with said long pinion a first clutch for connecting and disconnecting said input shaft to and from said second sun gear;

a second clutch for connecting and disconnecting said input shaft to and from said carrier;

an output member for outputting the rotation of said ring gear to drive wheels of the vehicle; and wherein said automatic transmission provides at least six forward speeds and one reverse speed, and said first clutch and said second clutch are engaged together in fourth speed forward;

wherein said first planetary gear unit and said engaging means are located on one axial side of said second planetary gear unit;

wherein said first clutch and said second clutch are located on a side of said second planetary gear unit axially opposite said one side; and wherein said output member is disposed between (1) said second planetary gear unit and (2) said first planetary gear unit and said engaging means; and wherein:

in first speed forward, said first clutch and said third brake are engaged;

in second speed forward, said first clutch and said second brake are engaged;

in third speed forward, the decelerated rotation is input to said first rotary element from said decelerated rotary component, and said first clutch is engaged;

in fourth speed forward, said first clutch and said second clutch are both engaged;

in fifth speed forward, decelerated rotation is input to said first rotary element from said decelerated rotary component, and said second clutch is engaged;

in sixth speed forward, said second clutch and said second brake are engaged; and in first speed reverse, decelerated rotation is input to said first rotary element from said decelerated rotary component, and said third brake is engaged.

12. An automatic transmission according to claim 11, wherein said engaging means is a first brake for braking said intermediate component.

13. An automatic transmission according to claim 12, further comprising:

a case housing said first and second planetary gear units;

wherein first brake is located on the side of said first planetary gear unit axially opposite said second planetary gear unit; and wherein the hydraulic servo of said first brake comprises a cylinder formed in the case.

14. An automatic transmission according to claim 12, further comprising:

a second brake for fixing the first rotary element against rotation and wherein said decelerated rotation is input to said first rotary element;

wherein said first brake and second brake each comprise friction members and a hydraulic servo for engaging said friction members; and wherein the hydraulic servo of said first brake is located radially inward of the hydraulic servo of said second brake, and the friction members of said first brake are intermeshed with members extending between the hydraulic servo of said first brake and the hydraulic servo of the second brake.

15. An automatic transmission according to claim 11, wherein said engaging means is a third clutch located between said input shaft and said input rotary component, and a first brake for braking said intermediate component.

16. An automatic transmission according to claim 11, wherein said engaging means is a third clutch located between said input shaft and said input rotary component.

17. An automatic transmission for a vehicle comprising:

a rotatably driven input shaft;

a decelerating first planetary gear unit comprising an input rotary component that receives as input the rotation of said input shaft, a decelerated rotary component that rotates at a speed decelerated from the speed of rotation of the input rotary component and an intermediate component for transfer of rotation from said input rotary component to said decelerated rotary component;

a second planetary gear unit comprising a first rotary element, a second rotary element, a third rotary element and a fourth rotary element, said second planetary gear unit receiving input of the decelerated rotation of said decelerated rotary component;

a first clutch for connecting and disconnecting said input shaft to and from said second rotary element;

a second clutch for connecting and disconnecting said input shaft to and from said third rotary element;

a third clutch, located between said input shaft and said input rotary component, for operating the rotation of said input rotary component or the rotation of said intermediate component; and an output member for outputting the rotation of said fourth rotary element to drive wheels of the vehicle;

wherein said automatic transmission provides at least five forward speeds and one reverse speed, and said first clutch and said second clutch are engaged together in fourth speed forward;

wherein said first planetary gear unit and said third clutch are located on one axial side of said second planetary gear unit;

wherein said first clutch and said second clutch are located on a side of said second planetary gear unit axially opposite said one side; and wherein said output member is disposed between (1) said second planetary gear unit and (2) said first planetary gear unit and said third clutch.

* * * * *

UNITED STATES PATENT AND TRADEMARK OFFICE
CERTIFICATE OF CORRECTION

| | | |
|---|---|---|
| PATENT NO. | : 7,422,538 B2 | |
| APPLICATION NO. | : 10/519456 | |
| DATED | : September 9, 2008 | |
| INVENTOR(S) | : Kazumichi Kayayama et al. | |

It is certified that error appears in the above-identified patent and that said Letters Patent is hereby corrected as shown below:

Column 21, lines 10-13 (claim 11, lines 27-30):

"a ring gear linked to said output member and meshing
   with said long pinion a first clutch for connecting and
   disconnecting said input shaft to and from said second
   sun gear;"

should read:

-- a ring gear linked to said output member and meshing
   with said long pinion;
a first clutch for connecting and disconnecting said input shaft to and from said
   second sun gear; --

Signed and Sealed this

Second Day of December, 2008

JON W. DUDAS
*Director of the United States Patent and Trademark Office*